United States Patent [19]

Speth

[11] 4,287,634

[45] Sep. 8, 1981

[54] WINDSHIELD WIPER BLADE ASSEMBLY

[76] Inventor: Peter J. Speth, 239-25 88th Ave., Bellerose, N.Y. 11426

[21] Appl. No.: 172,881

[22] Filed: Jul. 28, 1980

[51] Int. Cl.³ .............................................. B60S 1/38
[52] U.S. Cl. ............................... 15/250.42; 15/250.33
[58] Field of Search ............ 15/250.33, 250.36–250.42

[56] References Cited

U.S. PATENT DOCUMENTS

| 2,876,482 | 3/1959 | Oishei | 15/250.42 |
| 3,644,957 | 2/1972 | Deibel et al. | 15/250.42 |
| 3,751,754 | 8/1973 | Quinlan et al. | 15/250.42 |

FOREIGN PATENT DOCUMENTS 1262991  4/1961  France ............................. 15/250.42

Primary Examiner—Peter Feldman
Attorney, Agent, or Firm—Blum, Kaplan, Friedman, Silberman & Beran

[57] ABSTRACT

A windshield wiper blade assembly is comprised of a flexible blade mounted to a pair of secondary yokes. A bridge joining the secondary yokes allows for quick release of the blade and yoke elements by outward deflection of the blade. The connection of bridge to secondary yoke also permits free rocking, within limits, of the blade in both directions relative to the bridge and the windshield, and a longitudinal sliding action which allows the blade to conform to a curved windshield during the wiper sweep without stressing the connection between the blade and secondary yokes.

8 Claims, 10 Drawing Figures

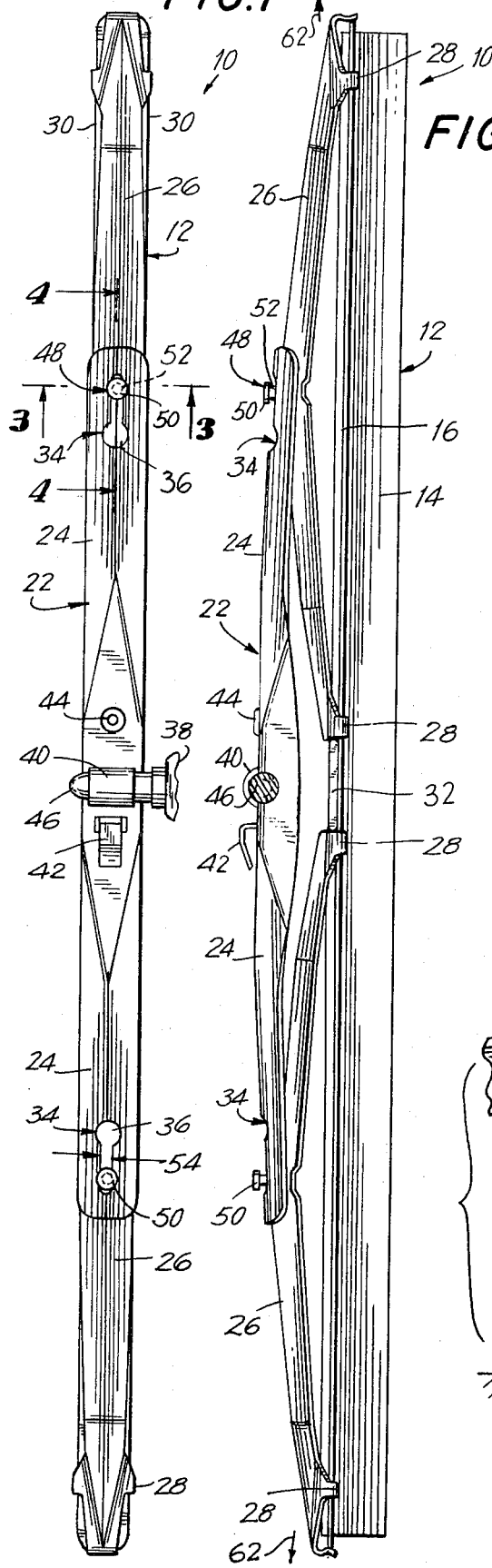
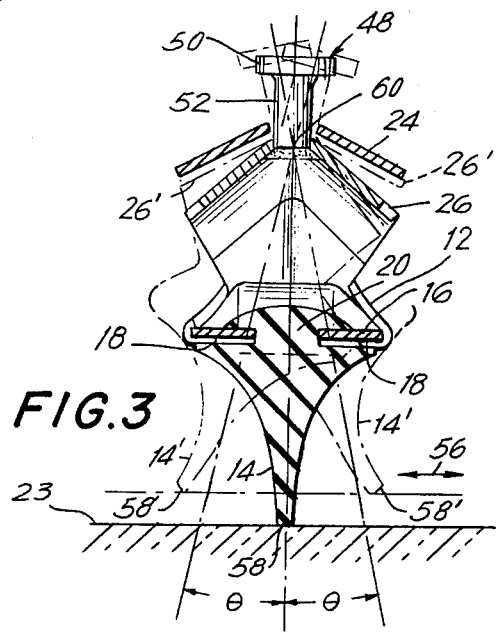
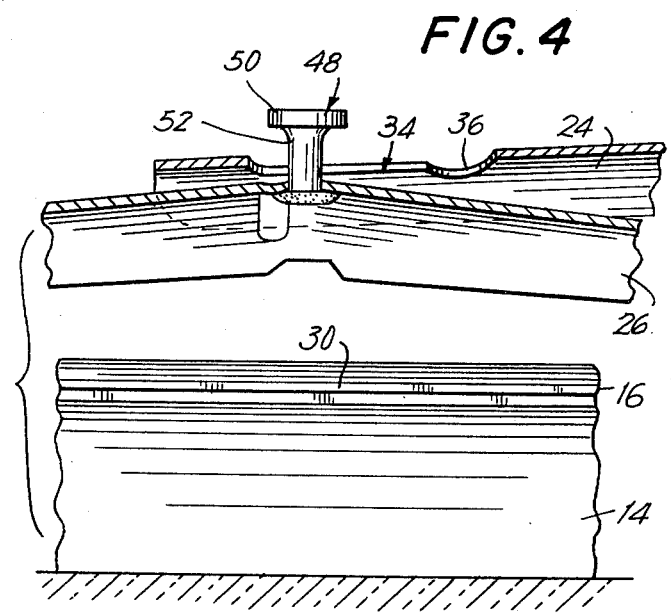

WINDSHIELD WIPER BLADE ASSEMBLY

BACKGROUND OF THE INVENTION

This invention relates generally to a windshield wiper blade assembly and more particularly to an assembly wherein the flexible blade is readily removed from the supporting structure for replacement, and the blade rocks or tilts for a better squeegee action in both directions against the windshield. For reasons of style, for better streamlining and more efficient fuel consumption, windshields for moving vehicles are fabricated with curved surfaces. Increased complexity in the design of windshield wiper blade assemblies has been the result in order to provide uniform pressure of the flexible blade against the curved surfaces so as to provide effective wiping. It is also desirable to make the blade readily replaceable without the need to replace or remove the mounting superstructure. This has resulted in complications in the design of joints between the superstructure and the blade as well as between elements of the superstructure.

Generally speaking, in the prior art, the blade assembly does not tilt or rock freely relative to the windshield as it makes its sweeping motions, such that tilting is only achieved by flexure of the rubber wiper blade. In practice, such tilting or rocking occurs only in one direction and the wiping action is not equally effective in both directions. Additionally, flexure of the rubber blade as it passes over the changing contours of a curved windshield produces stress points where the superstructure joins to the rubber blade.

What is needed is a windshield wiper blade assembly which allows the wiper blade to rock in both directions during wiping and also permits quick removal and replacement of wiper blades. A simple construction and operation without undue stress on the rubber components is also desirable.

SUMMARY OF THE INVENTION

Generally speaking, in accordance with the invention, an efective windshield wiper blade assembly which applies uniform pressure in following the curvatures of a windshield is provided. The wiper blade assembly is comprised of a flexible blade mounted to a pair of secondary yokes. A bridge joining the secondary yokes allows for quick release of the blade and yoke elements by outward deflection of the blade. The connection of the bridge to the secondary yokes also permits free rocking, within limits, of the blade in both directions relevant to the bridge and to the windshield. A longitudinal sliding action between the bridge and the secondary yokes allows the blade to conform to a curved windshield during the wiper sweep without stressing the connection of the rubber blade to the secondary yoke.

Accordingly, it is an object of this invention to provide an improved windshield wiper blade assembly wherein the blade rocks or tilts on the windshield equally in both directions during a complete sweep.

Another object of this invention is to provide an improved windshield wiper blade assembly of simple construction which permits quick release of the blade from the superstructure.

A further object of this invention is to provide an improved windshield wiper blade assembly which allows for longitudinal motion of the blade without stress and distortion in the rubber wiper element.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a plan view of a windshield wiper blade assembly in accordance with this invention;

FIG. 2 is a side elevational view of the windshield wiper blade assembly of FIG. 1;

FIG. 3 is a sectional view to an enlarged scale taken along the line 3—3 of FIG. 1;

FIG. 4 is a partial sectional view to an enlarged scale taken along the line 4—4 of FIG. 1;

DESCRIPTION OF THE PREFERRED EMBODIMENTS

Figure 5:
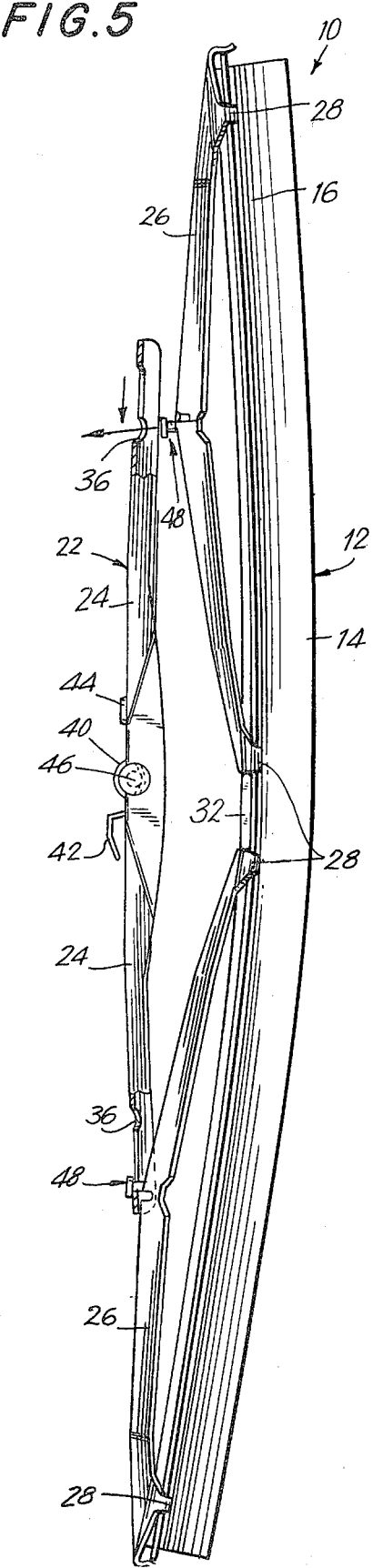
FIG. 5 is a side elevational view of the windshield wiper blade assembly of FIG. 1 shown in a flexed condition for disassembly.
Figure 6:
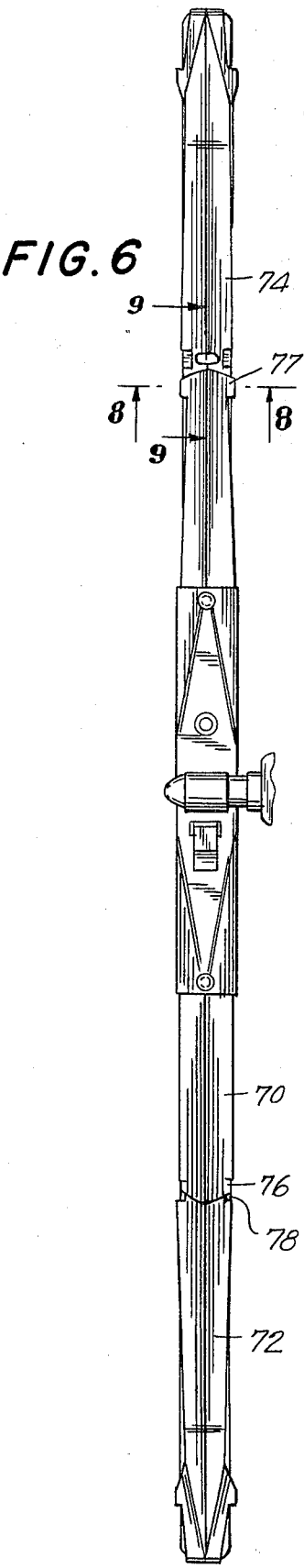
FIG. 6 is a plan view of an alternate embodiment of a windshield wiper blade assembly in accordance with this invention.

With reference to FIGS. 1-5, a windshield wiper blade assembly 10 in accordance with this invention includes a blade 12 having a flexible wiper element 14, for example, fabricated of rubber, joined to a flexible support 16 made of metal. In the known manner, the wiper element 14 is attached to the support 16 by means of narrow rectangular channels 18 extending longitudinally along the wiper element 14. A longitudinal slot 20 in the flexible support 16 allows passage therethrough of the upper portion of the flexible wiper element 14 such that the flexible support member 16 is seated in the channels 18. This construction of wiper element and backing is well known in the art and does not constitute a novel portion of this invention. For this reason a more detailed description is not presented herein.

A superstructure 22 for applying a force which holds the windshield wiper blade assembly 10 against a windshield 23, includes a primary yoke 24 or bridge and a pair of similar secondary yokes 26. The yokes 26 are arched and include lateral claws 28 proximate both ends which in a conventional manner clasp the lateral edges 30 of the flexible metal support 16 and slide therealong. A bumper 32 on blade 14 is engaged by inner claws 28 to limit inward movement of each yoke 26 toward the center of the blade. Interconnection of primary yoke 24 with yokes 26 limit outward movement of the yokes 26 to prevent inadvertent disassembly. Disengagement of primary yoke 24 from the secondary yokes 26 by means to be hereafter described permits longitudinal sliding of the blade 12 relative to the claws 28 such that the blade 12 may be entirely disengaged from the superstructure 22 for wiper blade replacement.

The primary yoke 24 is arched and has longitudinally oriented keyhole openings 34 at both ends, the enlarged portions 36 of the openings 34 being closest to the center of the primary yoke 24. Conventional means are provided at the center of the primary yoke 24 for attachment to the windshield wiper arm 38. The attachment means includes a loop 40 integral with the primary yoke 24 and a spring clip held within the curvature of the yoke 24 by means of a fastener 44. Between the loop 40 and the spring clip 42 is a circular opening through which a shaft 46, integral with the windshield wiper arm 38, is passed and contrained until the spring clip 42 is manipulated, all in the known manner, for release of the windshield wiper blade assembly 10.

Although the windshield wiper blade assembly 10 in accordance with this invention provides many degrees of flexibility, the yokes 24, 26 are substantially rigid. Flexibility is derived from the nature of the connections between the primary yoke 24 and the secondary yokes 26 and between the secondary yokes 26 and the blade 12 as described hereinafter. At each point of connection between the primary yoke 24 and the secondary yokes 26, a post 48 having a head 50 and a stem 52 extends from the yoke 26. The stem 52 of the post 48 is fixedly attached to the yoke 26 by any suitable means, for example, welding or brazing when both parts are of metal. The diameter of the enlarged portion 36 of the keyhole openings 34 is sufficiently large to allow passage therethrough of the head 50 of the post 48. The width 54 of the keyhole opening 34 is sufficient to allow a freely sliding fit with the stem 52 of the post 48. The head 50 of the post 48 will not pass through the opening 54 of the narrower portion of the keyhole 34.

As best seen in FIGS. 3 and 4, both yokes 24, 26 are V shaped at the point of connection, with the secondary yokes 26 being nested within the primary yoke 24. The V of the secondary yokes 26 is more acute in its central angle than the angle of the primary yoke 24 such that the secondary yoke 26 with its attached blade 12 is able to rock in both directions $\theta$ from a position normal to the windshield 23. The limit to the angle $\theta$ of rocking is determined when the surface of the secondary yoke 26 makes contact with the primary yoke 24 as indicated in FIG. 3 by broken lines and reference numerals 26'. The fit between the stem 52 of the post 48 and the enlongated portion of the keyhole opening 34 does not interfere with this rocking motion. Thus, as the flexible wiper element 14 sweeps across the windshield 23, as indicated by the arrow 56, there is a rocking motion of the blade 12 and secondary yokes 26 in both directions $\theta$ induced by the friction of the wiper element 14 against the windshield 23. Although there is some flexing of the wiper 14 near the very edge 58 of contact, the major portion of rocking of the wiper 14 relative to the windshield 23 is provided about a pivot point 60 located proximate to the joint between the two yoke members 24, 26. Substantially equal rocking angles $\theta$ are produced in both directions as the blade assembly 10 sweeps back and forth across the windshield 23.

In normal operaion, because of the curvature of the windshield 23, the blade 12, comprising the flexible wiper element 14 and the flexible support 16, is flexed in the direction toward the primary yoke or bridge 24. In order to separate the primary yoke 24 from the remainder of the windshield wiper blade assembly 10, the blade 12 and metal support 16 are flexed away from the primary yoke 24 as shown in FIG. 5. In achieving this flexed condition, one post 48 longitudinally translates along the keyhole opening 34 so as to reach the enlarged portion 36 of the keyhole opening 34. Then the head 50 of the post 48 is passed through the enlarged portion 36 of the keyhole opening 34 to separate the secondary yoke 26 from the primary yoke 24. As shown in FIG. 5, during this flexing operation the post 48 on the other secondary yoke 26 remains engaged within the associated keyhole 34. After the one end of the primary yoke 24 has been separated from the associated secondary yoke 26, the other end is readily freed from its associated yoke 26 merely by sliding the yokes 24, 26 longitudinally relative to each other until the head 50 of the other post 48 passes through the enlarged portion 36 of the keyhole opening 34.

To assemble the primary yoke 24 to the secondary yokes 26, one post 48 is slipped through the associated keyhole opening 34 and then the blade 12 is flexed as shown in FIG. 5 until the head 50 of the other post 48 is aligned to the enlarged portion 36 of the associated keyhole opening 34. The head 50 is passed through the enlarged portion 36 of the keyhole opening 34 and the blade 12 is allowed to unflex to produce the condition shown in FIG. 2. In this way the blade 12 is attached to the primary yoke 24.

When the secondary yokes 26 are disengaged from the primary yoke 24, the yokes 26 are separated from the blade 12 by sliding the yokes 26 in the direction indicated by the arrows 62 (FIG. 2).

It should be noted that during flexure of the blade 12 during operation against a windshield 23, the blade 12 is free not only to rock within defined limits but also is able to slide longitudinally relative to the primary yoke 24 by means of a sliding motion of the stems 52 of the posts 48 along the narrower portions of the keyhole openings 34. In this way stresses which are produced in the flexible wiper element 14 at the point of engagement by means of the claw 28 are avoided. In conventional designs where such sliding is not provided at the intersection of the primary and secondary yokes 24, 26, considerable distortion and stress is produced in the wiper element 14. As the chord length of the wiper element 14 changes as the wiper element engages windshield areas of different radii of curvature, the sliding action permits the wiper element to more closely follow the changing contour of the windshield for better wiping action. Such stresses also have a detrimental effect on the wiper material, especially when rubber, or the like, is used.

An alternaative embodiment of this invention is shown in FIGS. 6-10. The alternative embodiment 110 is similar to the assembly 10 described above and corresponding parts in FIGS. 6-10 have the same reference numerals, with the value 100 added, as in FIGS. 1-5. For example, the blade 12 of FIGS. 1-5 is identified as blade 112 in FIGS. 6-10. The structures differ in the attachments between a primary yoke 70 and secondary yokes 72, 74. The primary yoke 70 includes claws 76, 77 extending from the side edges at both extremities of the yoke 70. The secondary yoke 72 has laterally opposed notches 78 on its edges and the claws 76 of the primary yoke 70 pass through the notches 78 and turn inwardly toward themselves beneath the yoke 72 such that a flexible but permanent connection is made between the secondary yoke 72 and the end of the primary yoke 70 having the claws at its end.

Figure 10:
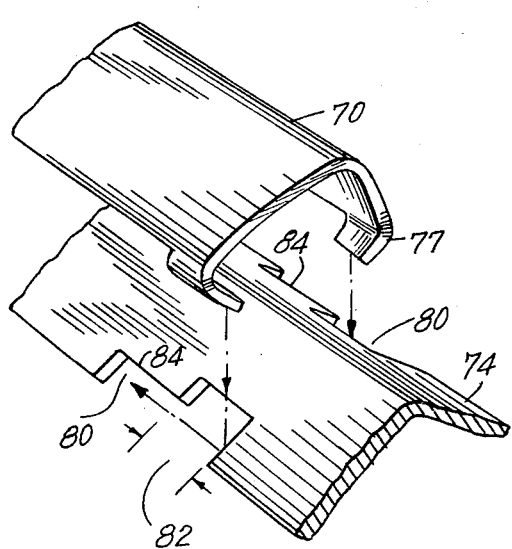
FIG. 10 is a partial perspective, exploded view of the windshield wiper blade assembly of FIG. 6.
Figure 9:
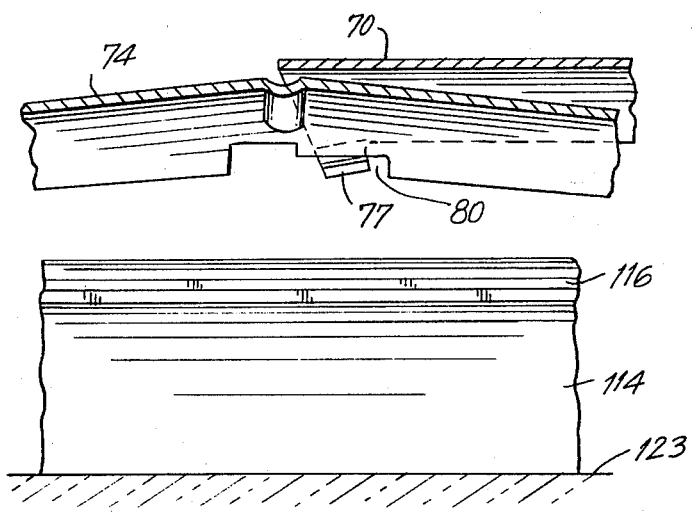
FIG. 9 is a partial sectional view to an enlarged scale taken along the line 9—9 of FIG. 6.

As best seen in FIGS. 9 and 10, the other secondary yoke 74 has stepped notches 80 formed in the side edges wherein the claws 77 of the primary yoke 70 are received and slidingly engaged. To engage the yoke 70 with the secondary yoke 74 the claws 77 are passed through the notch 80 in the zone 82 of greater notch depth. Then, the claws 77 are slid so as to receive therebetween the edges 84 of the notch 80. It is not possible to separate the secondary yoke 74 from the primary yoke 70 while the claws 77 enclose the edges 84.

Figure 7:
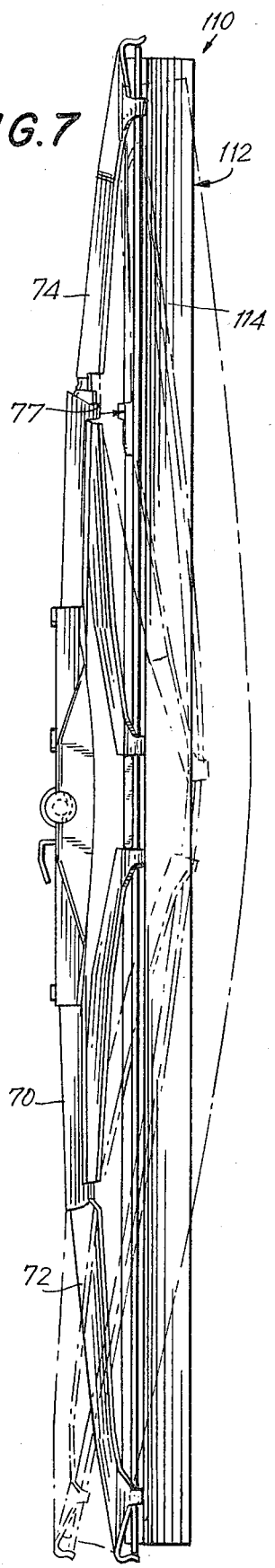
FIG. 7 is a side elevational view of the windshield wiper blade assembly of FIG. 6, also showing a flexed condition for disassembly in phantom lines.

This completely attached condition between the primary yoke 70 and the secondary yokes 72, 74 exists when the blade 112 is in an unflexed condition as shown by the solid lines of FIG. 7. Disengagement of these two elements is accomplished when the blade 112 is flexed away from the primary yoke 70 as seen in FIG. 7. When flexed as shown in FIG. 7, the zone 82 of greatest notch depth is aligned with the claws 77 on the primary yoke 70, whereby the claws 70 are readily passed through the notch 80. No restraining clips are required to prevent disengagement between the primary yoke 70 and the secondary yoke 74 when the wiper blade assembly 110 is unflexed or is flexed inwardly toward the primary yoke 70 because of pressure exerted during operation in conforming to a curved windshield 123.

Figure 8:
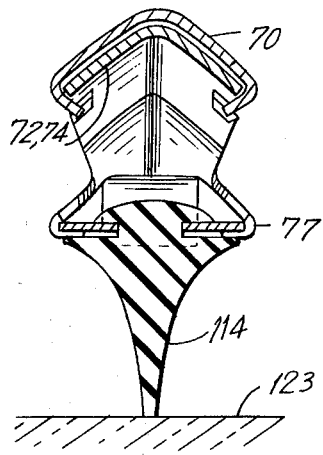
FIG. 8 is a sectional view to an enlarged scale taken along the line 8—8 of FIG. 6.

As seen in FIG. 8, the primary yoke 70 and the secondary yokes 72, 74 are V-shaped in cross section. The secondary yokes nest within the contours of the primary yoke 70 such that little rocking occurs at the connections between the primary and secondary yokes.

It should be understood that in embodiments of this invention, materials other than those cited above may be used. For example, the wiper 14 may be a material other than rubber so long as it is flexible and suited to the purpose of providing a good squeegee action against the windshield. The flexible support 16 may be a material other than metal, for example, a flexible plastic. The yokes may be metal or plastic. Also, in the embodiments described above the yokes are V-shaped in cross section at their points of connection. In alternative embodiment of this invention, the cross sections may have other contours for example rounded, oval, flat.

Further, it should be understood that in an alternative embodiment of this invention the locations of the post 48 and the keyhole openings 34 may be reversed without affecting the operation of the windshield wiper blade assembly. In particular, the posts may be attached at the ends of the primary yoke extending through keyhole openings formed in the secondary yokes. Further in another alternative embodiment in accordance with this invention the primary yoke may have a post on one end and a keyhole opening on the other end with cooperating elements on the associated secondary yokes.

In still another alternative embodiment, a post and keyhole joining of primary and secondary yokes may be effected on one end of the primary yoke, and a claw and notch joining may be effected on the other end of the primary yoke.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also understood that the following claims are intended to cover all of the generic and specific features of the invention herein described and all statements of the scope of the invention which, as a matter of language, might be said to fall therebetween.

What is claimed is:

1. In a windshield wiper blade assembly including a flexible wiper blade element of extended length and having a flexible support, a pair of secondary yokes connected to said flexible wiper element and support, a primary yoke extended between said pair of secondary yokes, said primary yoke being connectable to an arm for driving said windshield wiper blade assembly across a windshield, the improvement therein comprising:

means for connecting said primary yoke to each said secondary yoke, said means for connection including a post fixed at one end portion to one connected member, another portion of said post being enlarged; at elongated opening in the other connected member, said opening having an enlarged portion along its length, said enlarged portion being sized to admit therethrough said enlarged portion of said post, the non-enlarged portion of said opening not admitting said enlarged portion of said post, said non-enlarged portion of said opening admitting a non-enlarged portion of said post, whereby said post can pass through said enlarged portion of said opening and engagedly slide along the length of said opening, said yokes including a V-shaped cross-section, the V-cross-section of said secondary yokes including smaller angles then said primary yoke and nesting within said primary yoke, the apex of each said secondary yoke contacting and pivoting on the apex of said primary yoke, whereby symmetrical pivoting about the apexes is provided.

2. A windshield wiper blade assembly as claimed in claim 1, wherein said post is fixed to said secondary yoke and said opening is formed in said primary yoke.

3. A windshield wiper blade assembly as claimed in claim 2, wherein the longitudinal axes of said posts substantially bisect the V angles of the connected yokes, said yokes being static, and an equal range of rocking is provided in both directions when said windshield wiper blade assembly sweeps back and forth over said windshield.

4. A windshield wiper blade assembly as claimed in claim 1 or 2, wherein said secondary yokes are constrained to limited longitudinal movement relative to said wiper blade element and support, said posts being engaged in said non-enlarged portions of said openings when said wiper blade element and a support are in an unflexed condition.

5. A windshield wiper blade assembly as claimed in claim 1, wherein the longitudinal center line of said elongated openings parallels said extended length of said flexible wiper blade element, said posts being engaged with said non-enlarged portions of said openings when said blade is unflexed.

6. A windshield wiper blade assembly as claimed in claim 5, wherein one of said posts aligns with one of said enlarged openings when said wiper blade element and support are flexed away from said primary yoke, whereby while flexed a connected primary and secondary yoke are separable by passing said post through said aligned opening.

7. A windshield wiper blade assembly including a flexible wiper blade element of extended length and having a flexible support, a pair of secondary yokes connected to said flexible wiper element and support, a primary yoke extended between said pair of secondary yokes, said primary yoke being connectable to an arm for driving said windshield wiper blade assembly across a windshield, the improvement therein comprising:

means for connecting said primary yoke to said pair of secondary yokes, said means for connecting including a portion wherein said primary yoke moves relative to said secondary yokes without disengagement, and another portion wherein said primary yoke is separable from said secondary yoke, said primary yoke remaining engaged with said secondary yokes when said flexible wiper blade element and said flexible support are flexed toward said primary yoke, said primary yoke and said secondary yokes moving relative to one another to permit disengagement of said primary and said secondary yokes when said flexible wiper blade element and said flexible support are flexed away from said primary yoke, said yokes including a V-shaped cross-section, the V-cross-section of said secondary yokes including smaller angles then said primary yoke and nesting within said primary yoke, the apex of each said secondary yoke contacting and pivoting on the apex of said primary yoke, whereby symmetrical pivoting about the apexes is provided during sweeps over said windshield.

8. A windshield wiper blade assembly as claimed in claim 7, wherein said means for connecting said primary yoke to each said secondary yoke include a post fixed at one end portion to one connected member, another portion of said post being enlarged; an elongated opening in the other connected member, said opening slidingly constraining a non-enlarged portion of said post, whereby said post can engagedly slide along the length of said opening.

* * * * *